United States Patent
Yeo et al.

(10) Patent No.: US 7,309,852 B2
(45) Date of Patent: Dec. 18, 2007

(54) VARIABLE NOISE CONTROL FOR AN OPTICAL TRANSDUCER

(75) Inventors: Kok-Soon Yeo, Singapore (SG); Lian-Chun Xu, Singapore (SG); Chee-Keong Teo, Singapore (SG); John Julius De Leon Asuncion, Singapore (SG)

(73) Assignee: Avago Technologies ECBU IP (Singapore) Pte Ltd., Singapore (SG)

( * ) Notice: Subject to any disclaimer, the term of this patent is extended or adjusted under 35 U.S.C. 154(b) by 655 days.

(21) Appl. No.: 10/968,564

(22) Filed: Oct. 18, 2004

(65) Prior Publication Data
US 2006/0081779 A1   Apr. 20, 2006

(51) Int. Cl.
G01J 5/00   (2006.01)
H01B 10/02  (2006.01)
(52) U.S. Cl. ............................ 250/214 AG; 250/214 C
(58) Field of Classification Search ............ 250/214 R, 250/214 AG, 214 C, 338.1, 202
See application file for complete search history.

(56) References Cited

U.S. PATENT DOCUMENTS

| 6,359,517 | B1 | 3/2002 | Colaco |
| 6,608,710 | B1 | 8/2003 | Battagin |
| 6,707,023 | B2 | 3/2004 | Fong et al. |
| 6,784,750 | B2 | 8/2004 | Chiou et al. |
| 2006/0034621 | A1* | 2/2006 | Denoyer ................ 398/208 |
| 2006/0133814 | A1* | 6/2006 | Hayashi ................. 398/135 |
| 2006/0216042 | A1* | 9/2006 | Yeo et al. ............... 398/209 |
| 2007/0194210 | A1* | 8/2007 | Lee et al. ............. 250/214 R |

FOREIGN PATENT DOCUMENTS

| EP | 0017596 A1 | 10/1980 |
| JP | 57026940 A | 2/1982 |
| JP | 1126031 A | 5/1989 |

* cited by examiner

Primary Examiner—John R. Lee

(57) ABSTRACT

In one embodiment, an optical transducer, such as an infrared transducer, generates an output signal that is representative of optical irradiance. A noise control circuit is coupled in a power supply path of the optical transducer. A switching circuit varies the noise control provided by the noise control circuit, in response to changes in the output signal of the optical transducer. The noise control may be varied in a number of different ways, including: turning the noise control on or off, varying the noise control in discrete steps, or varying the noise control in a continuous manner. Methods for varying noise control in response to optical irradiance of an optical transducer are also disclosed.

20 Claims, 6 Drawing Sheets

VARIABLE NOISE CONTROL FOR AN OPTICAL TRANSDUCER

BACKGROUND

Wireless infrared data communications are standardized by the Infrared Data Association (IrDA) in a series of published specifications. IrDA specifications support a wide range of data rates (i.e., from 9.6 kbps to 16 Mbps) in three data rate modes (i.e., SIR or Serial Infrared up to 115.2 kbps, FIR or Fast Infrared up to 4 Mbps, and VFIR or Very Fast Infrared up to 16 Mbps). IrDA supports a wide range of radiant signal intensities at the output of wireless transmitters, 3.6 to 500 mW/sr in two power modes (i.e. low and standard). IrDA also supports communication distances from zero to one meter.

In view of the wide-ranging data rates, signal intensities, and transmission distances supported by IrDA, IR receivers must accommodate a wide dynamic range of inputs over a wide frequency bandwidth. This may be accomplished, in part, using variable gain amplification. In the case of minimal irradiance, IR receivers must be configured for maximum gain in order to identify data transmissions. However, when configured for maximum gain, IR receivers become increasingly susceptible to erroneous signal transitions as a result of power supply noise.

The performance of a circuit in rejecting power supply noise may be quantified as a power supply rejection ratio (PSRR). Poor PSRR performance by an IR receiver may result in a phenomenon known as "dark bits," which are unwanted pulses that are generated by the receiver when no optical signal has been received. Unwanted amplification of noise, resulting in the unwanted generation of dark bits, becomes more prevalent as a receiver's bandwidth increases to accommodate increased data rates.

SUMMARY OF THE INVENTION

In one embodiment, apparatus comprises an optical transducer, a noise control circuit, and a switching circuit. The transducer generates an output signal representative of optical irradiance. The noise control circuit is coupled in a power supply path of the transducer, and the switching circuit varies the noise control provided by the noise control circuit in response to changes in the output signal of the transducer.

In another embodiment, as optical irradiance of an optical transducer decreases, the gain of one or more amplifier stages that receive an output of the transducer is increased. A noise control circuit is then switched into a power supply path of the transducer as the gain of the amplifier stage(s) increases above a first threshold. As optical irradiance of the transducer increases, the gain of the one or more amplifier stages is decreased. The noise control circuit is then switched out of the power supply path as the gain of the amplifier stage(s) decreases below a second threshold.

In yet another embodiment, as optical irradiance of an optical transducer decreases, the gain of one or more amplifier stages receiving an output of the optical transducer is increased, and the noise control provided by a noise control circuit coupled in a power supply path of the optical transducer is increased.

Other embodiments are also disclosed.

BRIEF DESCRIPTION OF THE DRAWINGS

Illustrative and presently preferred embodiments of the invention are illustrated in the drawings, in which.

DETAILED DESCRIPTION OF AN EMBODIMENT

Figure 1:
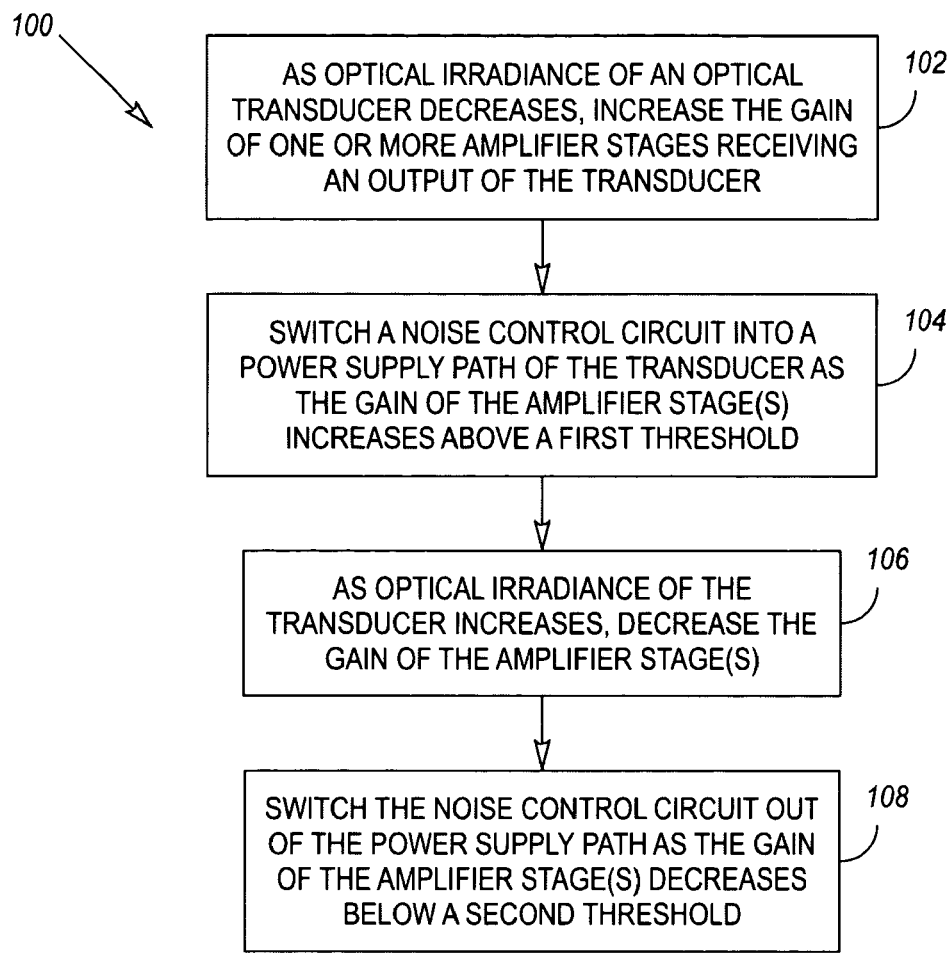
FIG. 1 illustrates a first exemplary method for varying the noise control provided to an optical transducer.

FIG. 1 illustrates a first exemplary method 100 for varying the noise control provided to an optical transducer. By way of example, the optical transducer may take the form of an infrared (IR) transducer that is designed to convert optical signals received from an IR transmitter into electrical signals.

In accordance with the method 100, as optical irradiance of the transducer decreases, the gain of one or more amplifier stages that receive an output of the transducer is increased 102. When the gain of the amplifier stage(s) increases above a first threshold, a noise control circuit is switched into 104 a power supply path of the transducer. As optical irradiance of the transducer increases, the gain of the one or more amplifier stages is decreased 106. When the gain of the amplifier stage(s) decreases below a second threshold, the noise control circuit is switched out 108 of the power supply path. The first and second thresholds may be the same or different.

Under high gain conditions, the amplifier stage(s) are more susceptible to amplifying power supply noise, to the point where the amplified noise might be mistakenly identified as valid signals (i.e., unwanted "dark bits"). By switching the noise control circuit into the transducer's power supply path under high gain conditions, the method 100 increases the power supply rejection ratio (PSRR) of an optical receiver, thereby decreasing the likelihood that dark bits will be generated by the receiver. Then, under low gain conditions, where the amplitude of the transducer's output is substantially greater than any likely power supply noise, the noise control circuit may be switched out of the transducer's power supply path, thereby increasing the responsiveness of a receiver to high bandwidth transmissions.

Figure 2:
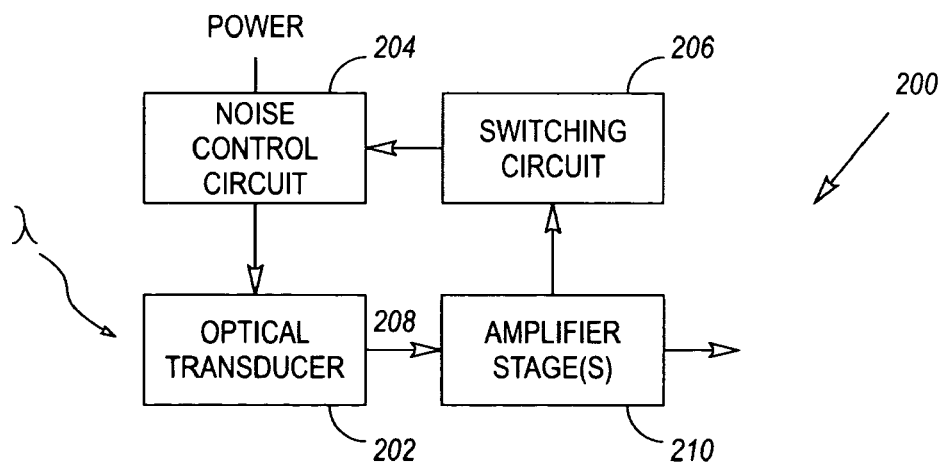
FIG. 2 illustrates an exemplary optical receiver that may be used to implement the FIG. 1 method.

FIG. 2 illustrates an exemplary optical receiver 200 that may be used to implement the method 100. The receiver 200 comprises an optical transducer 202, a noise control circuit 204, and a switching circuit 206. The transducer 202 generates an output signal 208 representative of optical irradiance (λ). The noise control circuit 204 is coupled in a power supply path of the transducer 202 and, in response to changes in the output signal 208 of the transducer 202, the switching circuit 206 varies the noise control provided by the noise control circuit 204. The receiver 200 may also comprise one or more amplifier stages 210 that receive the output 208 of the transducer 202. In one embodiment, the noise control is varied by simply turning the noise control circuit ON when the output signal 208 of the transducer 202 falls below a threshold, and turning the noise control circuit OFF when the output signal 208 rises above the threshold.

Figure 3:
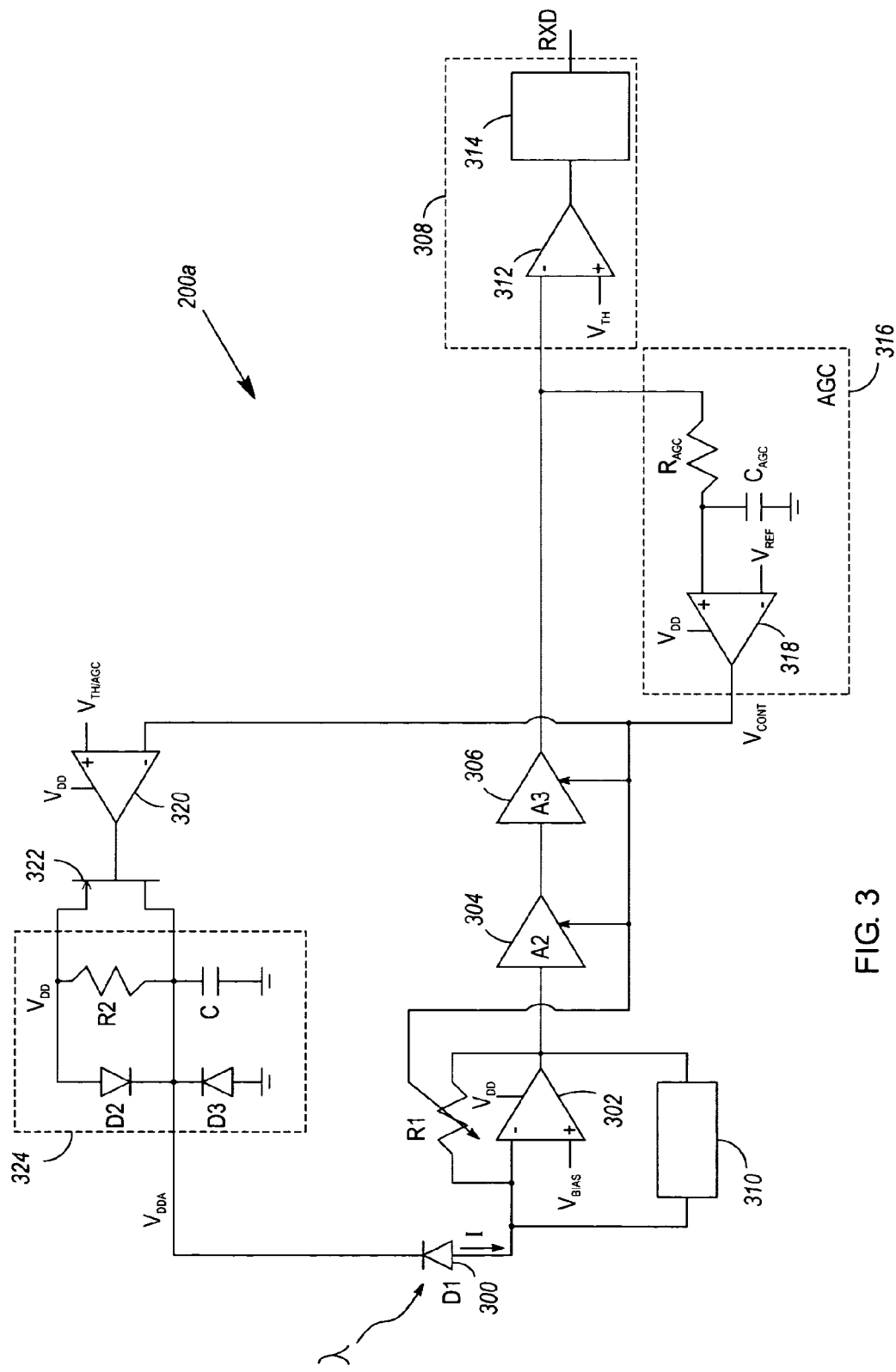
FIG. 3 illustrates one exemplary embodiment of the FIG. 2 receiver.

FIG. 3 illustrates one exemplary embodiment 200a of the receiver 200. In the receiver 200a, the optical transducer 202 takes the form of a photodiode 300, such as a positive-intrinsic-negative (PIN) diode, that is configured to sense IR signal transmissions. Coupled to the photodiode 300 are one or more amplifier stages 302, 304, 306, and an analog to digital converter (ADC) 308. In this manner, the photodiode 300 may receive pulses of IR light (λ), the amplifier stages 302-306 may convert the received pulses to voltages and amplify them, and the ADC 308 may convert the amplified voltages to digital values for consumption by a microprocessor or the like.

By way of example, the amplifier stages 302-306 comprise a transimpedance amplifier 302, a second stage amplifier 304, and a third stage amplifier 306. The transimpedance amplifier 302, biased by a voltage, $V_{BIAS}$, converts the output current (I) of the photodiode 300 into a voltage signal. The output of the transimpedance amplifier 302 is then additionally amplified, buffered and deskewed by the second and third stage amplifiers 304, 306.

A light cancellation circuit 310 may be used to remove undesirable low frequency and DC components from the output current, I, of the photodiode 300. Generally, sunlight causes the photodiode 300 to produce an undesirable DC current component. Also, man-made light, such as that produced by incandescent and fluorescent bulbs, can cause the photodiode 300 to produce an undesirable low frequency AC current component, generally ranging from 50 to 100 Hz. These undesirable current components may be removed, or at least suppressed, by the light cancellation circuit 310. In this manner, the amplifier stages 302-306 only amplify that portion of the photodiode's output current, I, that is representative of information received from a photo transmission source (e.g., an IR source).

The ADC 308 comprises a comparator 312 and decoder 314. Comparator 312 receives the voltage output from the third amplifier stage 306 and compares it to a threshold voltage, $V_{TH}$, to determine whether to output a voltage "high" or "low" signal to latch 314. Latch 314 periodically latches the output of comparator 312 in response to a signal acquisition clock. The output, RXD, of latch 314 is therefore a digital data stream representing variations in the infrared light signal received by the photodetector 300.

Given the wide range of optical irradiance that the photodiode 300 may experience, the receiver 200a includes an automatic gain control (AGC) circuit 316 for adjusting the gain of the amplifier stages 302-306. Without the AGC circuit 316, one or more of the amplifier stages 302-306 could saturate in response to strong signals, or fail to sufficiently amplify weak signals. As shown, the AGC circuit 316 receives the output voltage of the third amplifier stage 306, and generates control signal $V_{CONT}$. The control signal, $V_{CONT}$, is provided to the second and third amplifier stages 304, 306, as well as a variable resistor, R1, to control the respective gains of the amplifier stages 302-306.

The AGC circuit 316 maintains the output voltage of the third amplifier stage 306 within a desired range, despite the varying output current of the photodiode 300. The AGC circuit 316 could be configured to provide either a digital or analog control signal. In the receiver 200a, the AGC circuit 316 is an analog AGC circuit. The resistor, $R_{AGC}$, and capacitor, $C_{AGC}$, form a low pass filter for attenuating the output voltage of the third amplifier stage 306 at frequencies greater than a desired cutoff frequency, $f_c$, the value of which is determined by Equation 1.

$$f_c = 1/(2*\pi*R_{AGC}*C_{AGC})$$ Equation 1

Error amplifier 318 amplifies the difference between the output of the low pass filter ($R_{AGC}/C_{AGC}$) and a reference voltage, $V_{REF}$, to determine the magnitude of the gain control signal, $V_{CONT}$. Essentially, when there is no or low irradiance (i.e., when the photodiode's output current, I, is small), the magnitude of the gain control signal, $V_{CONT}$, will also be low, because the voltage at the non-inverting input of the error amplifier 318 is lower than the reference voltage, $V_{REF}$, at the inverting input of the error amplifier 318. When the magnitude of $V_{CONT}$ is at its lowest level, each of the amplifier stages 302-306 will be at its maximum amplification. As input irradiance increases (i.e., as the photodiode's output current increases), the magnitude of the gain control signal increases.

As shown in FIG. 3, the gain control signal, $V_{CONT}$, is also provided to a comparator 320, the output of which drives the gate of a switch 322 (e.g., a p-type metal-oxide semiconductor (PMOS) transistor). These components 320, 322 may collectively provide the function of the switching circuit 206 shown in FIG. 2. The switch 322 is couple in parallel with a noise control circuit 324. By way of example, the noise control circuit 324 is shown to be a first-order, low-pass, RC filter (i.e., an RC filter comprised of resistor, R2, and capacitor, C). However, the filter could alternately be a different type of filter.

The noise control circuit 324 is coupled between a power supply voltage, $V_{DD}$, and a node $V_{DDA}$. Node $V_{DDA}$ is in turn coupled to the cathode of the photodiode 300. When the switch 322 is ON, it effectively disables the noise control circuit 324 (i.e., turns it OFF) by shorting the resistor R2. When the switch 322 is OFF, the noise control circuit 324 is turned ON, and the power supply voltage, $V_{DD}$, is filtered by the low-pass filter formed by the resistor R2 and capacitor C.

The comparator 320 causes the switch 322 to switch the noise control circuit 324 ON and OFF by comparing the gain control signal, $V_{CONT}$, to a threshold voltage, VTH. When the magnitude of $V_{CONT}$ is less than $V_{TH}$, as would be the case during minimal irradiance of the photodiode 300, and maximum gain of the amplifier stages 302-306, the comparator 320 causes the switch 322 to be OFF, and the power supply voltage, $V_{DD}$, is filtered by the noise control circuit 324. When the magnitude of the gain control signal, $V_{CONT}$, is greater than $V_{TH}$, as would be the case during increased irradiance and lower gain, the comparator 320 causes the switch 322 to turn ON, and the noise control circuit 324 is turned OFF. A pair of diodes, D2 and D3, may be used to clamp the voltage swing at node VDDA, in the event that there is a sudden change in irradiance of the photodiode 300, coupled with a sudden current draw and an associated lag in turning switch 322 ON or OFF (which could, in the absence of the diodes, lead to the photodiode 300 losing its reverse bias).

By switching the noise control circuit 324 into the power supply path of the photodiode 300 during minimal irradiance and maximum gain of the receiver 200a, a sufficient amount of power supply noise is prevented from being amplified by the amplifier stages 302-306, thereby mitigating the likelihood of dark bits appearing at receiver output RXD. By switching the noise filter out of the photodiode's power supply path during higher levels of irradiance and lower levels of gain, a sizable voltage drop across the resistor R2 is prevented, and a negative impact on the performance of photodiode 300 is prevented. Moreover, during increased irradiance and gain, power supply noise tends to be harmless because the magnitude of the photodiode's output current is substantially greater than the magnitude of power supply noise.

Another benefit that can be realized using the noise control circuit 324 is the full integration of the circuit 324 on an integrated circuit along with other components of the receiver 200a. Without switching the noise control circuit 324 out of the photodiode's power supply path under conditions of high irradiance and low gain, it is typically not possible to integrate the noise control circuit 324 on an integrated circuit carrying other components of the receiver 200a. This is because the dynamic range of the current produced by the photodiode 300 ranges from a few nano-amps to a few milliamps, such that the resistor R2 would need to be relatively small to minimize the voltage drop developed across it by relatively large output currents of the photodiode 300. In view of this limitation on the size of the resistor R2, the capacitor C needs to be large in order to maintain a desirable cut-off frequency for the noise control circuit 324. Due to the size requirements of the capacitor, C, the capacitor is typically too large to be formed on an integrated circuit. However, by switching the noise control circuit 324 out of the photodiode's power supply path under conditions where the current draw of the photodiode is great, the resistor R2 can be made larger (e.g., tens to hundreds of killiohms), thus reducing the magnitude of the capacitor C (to, e.g., tens to hundreds of picofarads) and enabling the capacitor C to be integrated on an integrated circuit along with the other components of the receiver 200a. Thus, the receiver 200a eliminates the need for external filter components, thereby reducing the cost and parts-count of the receiver.

Figure 4:
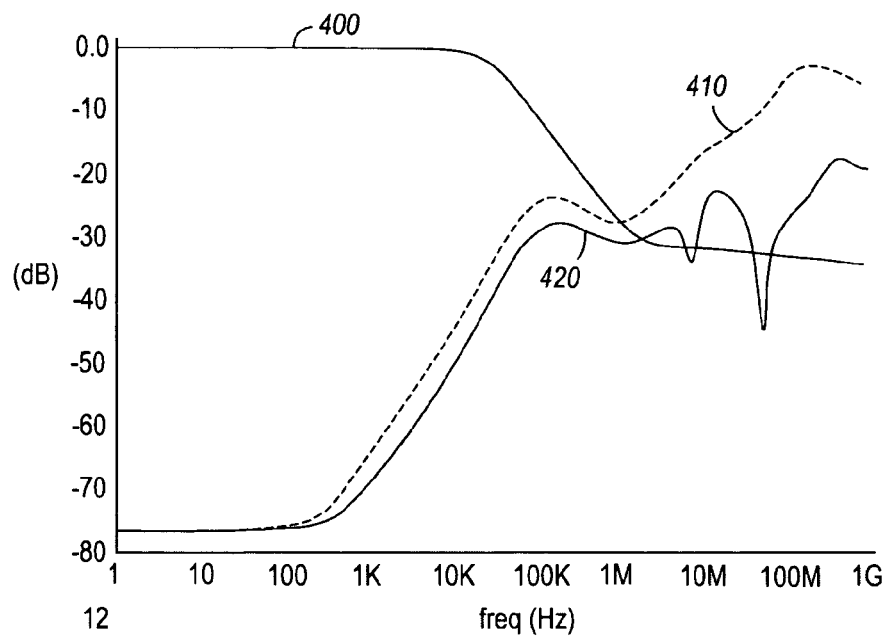
FIG. 4 illustrates power supply rejection ratio performance in the frequency domain of the receiver illustrated in FIG. 3.

FIG. 4 illustrates power supply rejection ratio (PSRR) performance in the frequency domain for the IR receiver shown in FIG. 3. By way of example, FIG. 4 assumes a value of 50 KΩ for the resistor R2, and a value of 80 pF for the capacitor C. FIG. 4 also assumes that the receiver 200a is operating in fast infrared (FIR) mode. If the R2/C filter were an ideal first-order low-pass filter, the filter would attenuate 20 decibel (dB)/decade (i.e., per order of magnitude increase in frequency). The maximum gain of the amplifier stages 302-306 could then be obtained by multiplying the gains of each. Thus, the maximum low pass gain is R1* A2*A3. The ideal relationship between the cutoff frequency ($f_c$) maximum low pass gain, and maximum gain ($A_{PSRR}$) at a certain frequency of interest, $f_{PSRR}$ (i.e., the PSSR at a particular frequency), is given by Equation 2:

$$f_c*(R1*A2*A3)=f_{PSRR}*A_{PSRR} \quad \text{Equation 2}$$

Utilizing Equation 2, the ideal PSRR performance of the receiver 200a can be determined at the input of ADC 308, and the values of the receiver's components can be fixed accordingly. Thus, the design of the noise control circuit 324 is interrelated to the design of the receiver 200a as a whole, which is in turn dependent upon design goals and constraints.

While an ideal circuit is preferred, it generally isn't feasible. In reality, the noise control circuit 324 is non-ideal, due in large part to the parasitic capacitances of the switch 322 and clamping diodes, D2 and D3. As can be seen in FIG. 4, frequency response 400 represents the attenuation provided by the noise filter at $V_{DDA}$, the output of the noise control circuit 324. Response 400 shows that the noise control circuit 324 does attenuate 20 dB/decade, but only for approximately 1.5 decades before settling at roughly 30 dB attenuation for frequencies above approximately 2 MHz. Still, the benefit of the RC filter (R2/C) can be seen by comparing response 410, representing the frequency response at the output of the transimpedance amplifier 302 without attenuation by the noise control circuit 324, and response 420, representing the frequency response at the output of the transimpedance amplifier with attenuation by the noise control circuit 324. It can be seen from response 420 that the PSRR performance improves when the noise control circuit 324 attenuates frequencies beginning around 39.8 kHz. The PSRR improvement is also visible in the time domain.

Figure 5:
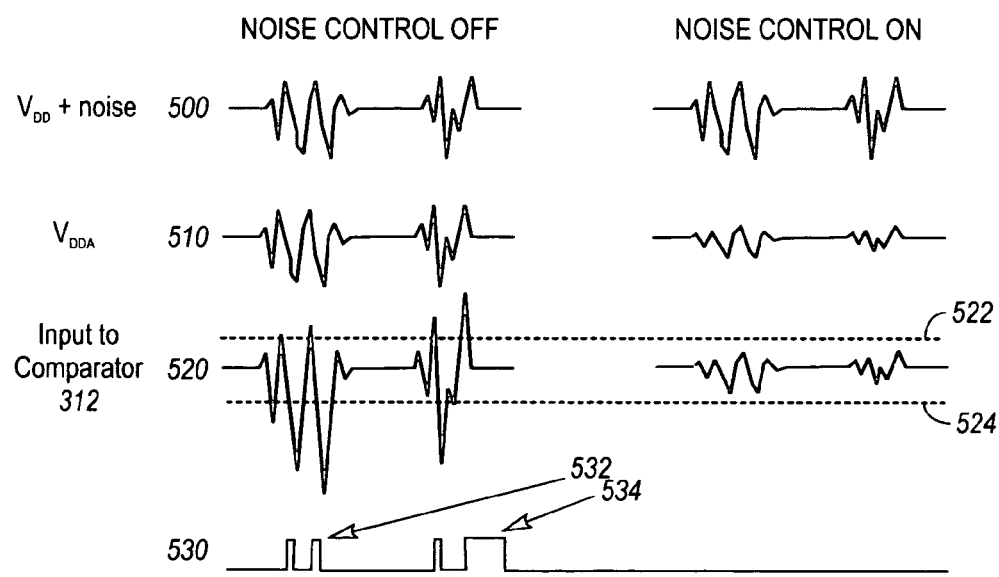
FIG. 5 illustrates power supply rejection ratio performance in the time domain of the receiver illustrated in FIG. 3.

FIG. 5 illustrates the time domain PSRR performance for the receiver 200a. Line 500 of the graph illustrates DC power supply voltage $V_{DD}$ coupled with noise. The voltage $V_{DD}$ remains the same, with or without the presence of the noise control circuit 324. On the other hand, the output of the noise control circuit 324, $V_{DDA}$, shows that power supply noise is attenuated when the noise control circuit 324 is turned ON (see line 510 of the graph). Line 520 of the graph shows that regardless of whether the noise control circuit 324 is ON, any noise appearing at node VDDA will be amplified by the time it reaches the input of the comparator 312. However, with the noise control circuit 324 ON, the amplified noise does not exceed the upper or lower thresholds 522, 524 of the comparator 312. Line 530 of the graph shows that, without the noise control circuit 324, amplified power supply noise appearing at the input of the comparator 312 can result in the generation of dark bits 532 at the receiver output, RXD.

Figure 6:
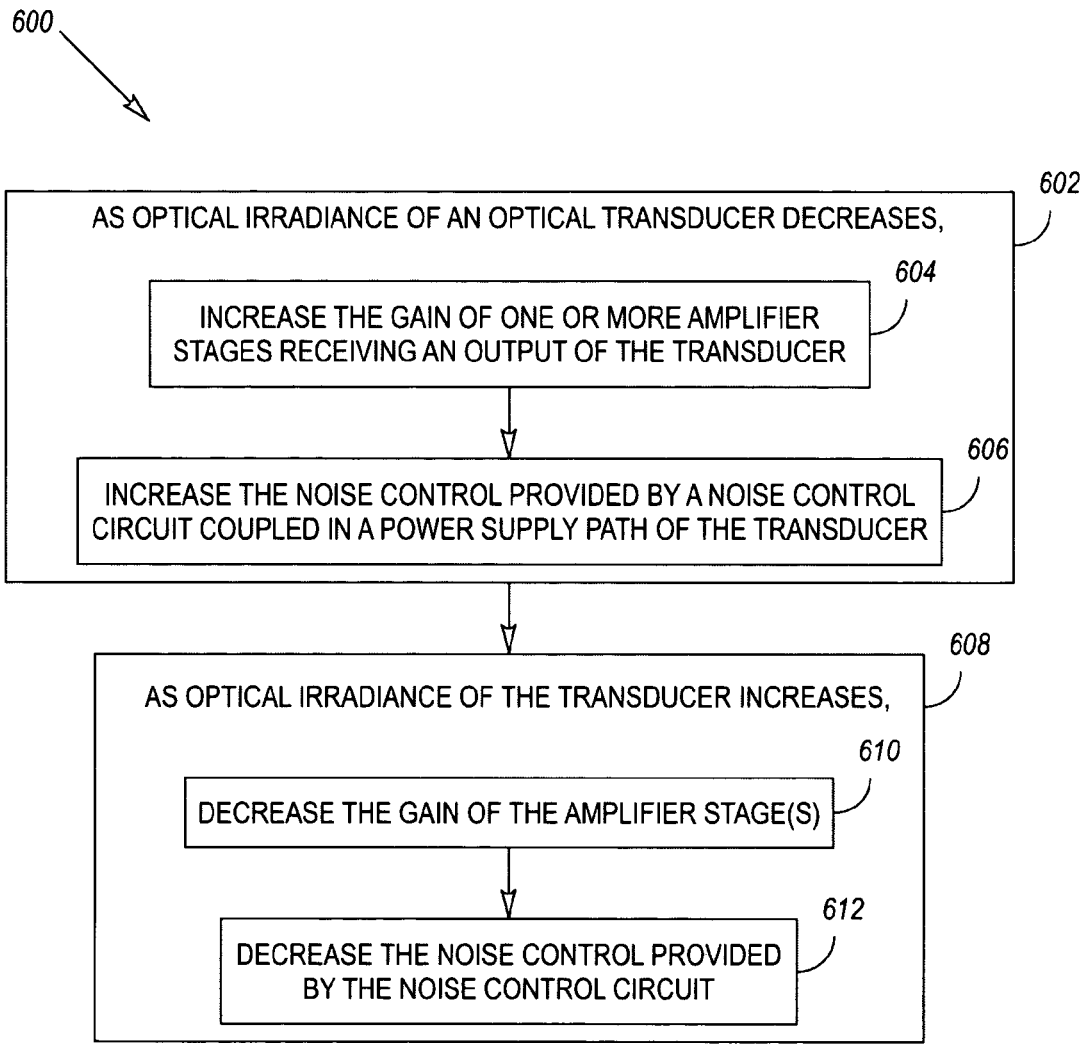
FIG. 6 illustrates a second exemplary method for varying the noise control provided to an optical transducer.

FIG. 6 illustrates a second exemplary method 600 for varying the noise control provided to an optical transducer. In accordance with the method 600, as optical irradiance of the transducer decreases 602, the gain of one or more amplifier stages that receive an output of the transducer is increased 604, and the noise control provided by a noise control circuit coupled in a power supply path of the optical transducer is increased 606. Similarly, as optical irradiance of the transducer increases 608, the gain of the one or more amplifier stages is decreased 610, and the noise control provided by the noise control circuit is decreased 612.

Figure 7:
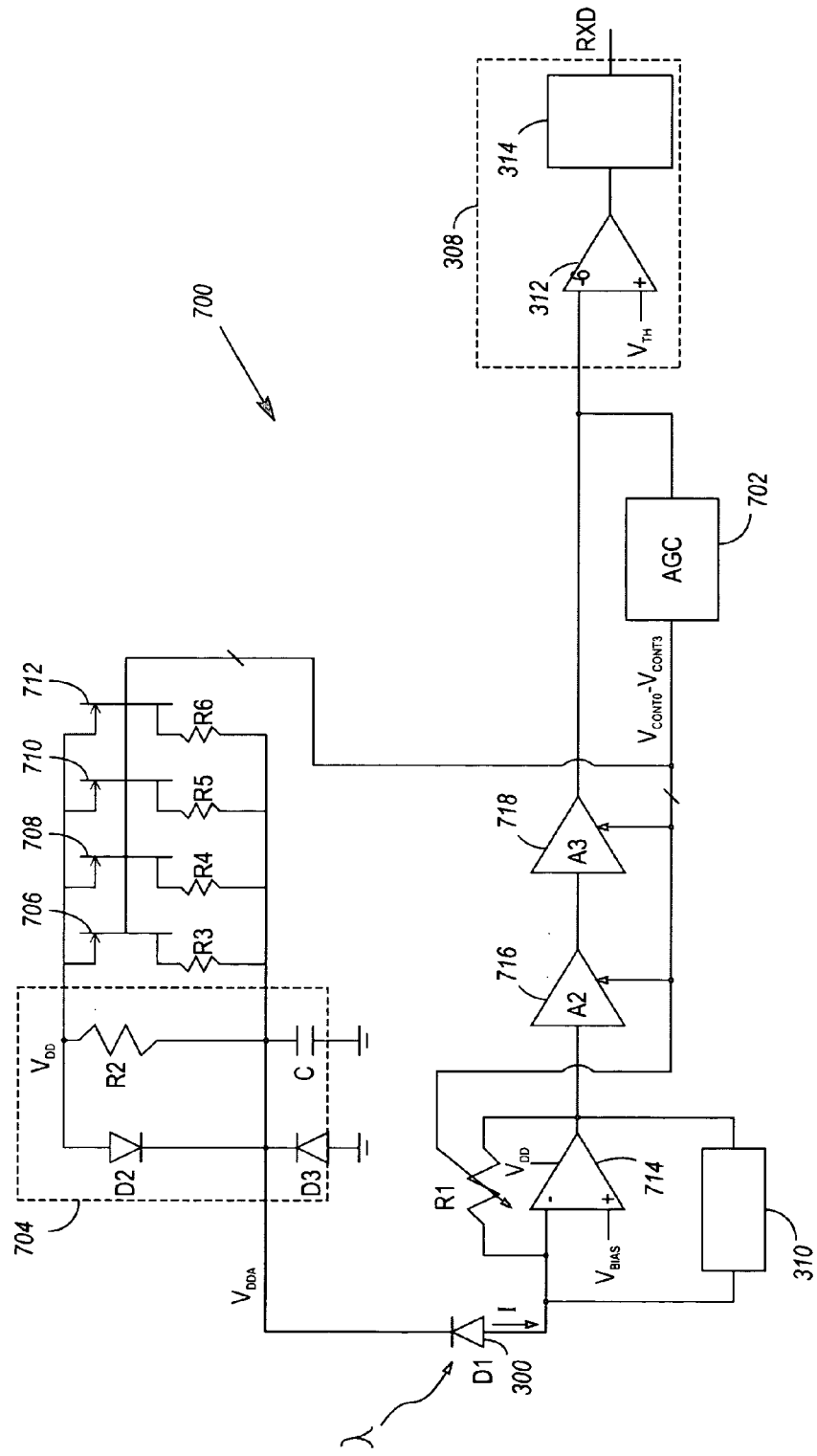
FIG. 7 illustrates a first exemplary optical receiver that may be used to implement the FIG. 6 method.

FIG. 7 illustrates a first exemplary optical receiver 700 that may be used to implement the method 600. The receiver 700 is similar to the receiver 200a shown in FIG. 3, but for the fact that the AGC circuit 702 is a digital decoder that provides a digitally encoded value via a plurality of control outputs, VCONT0-VCONT3. In this manner the noise control provided by the noise control circuit 704 can be increased and decreased in multiple, discrete steps.

As shown in FIG. 7, the discretely variable noise control circuit 704 may comprise multiple switches 706, 708, 710, 712 (e.g., multiple PMOS transistors) coupled in series with multiple resistors R3, R4, R5, R6. These switch and resistor legs are then coupled in parallel between the power supply voltage, $V_{DD}$, and node $V_{DDA}$. Each of the switches 706-712 is controlled by a different output of the digital decoder 702, such that the effective resistance coupled between VDD and VDDA varies along with the gain of the digitally-controlled amplifier stages 714, 716, 718.

Figure 8:
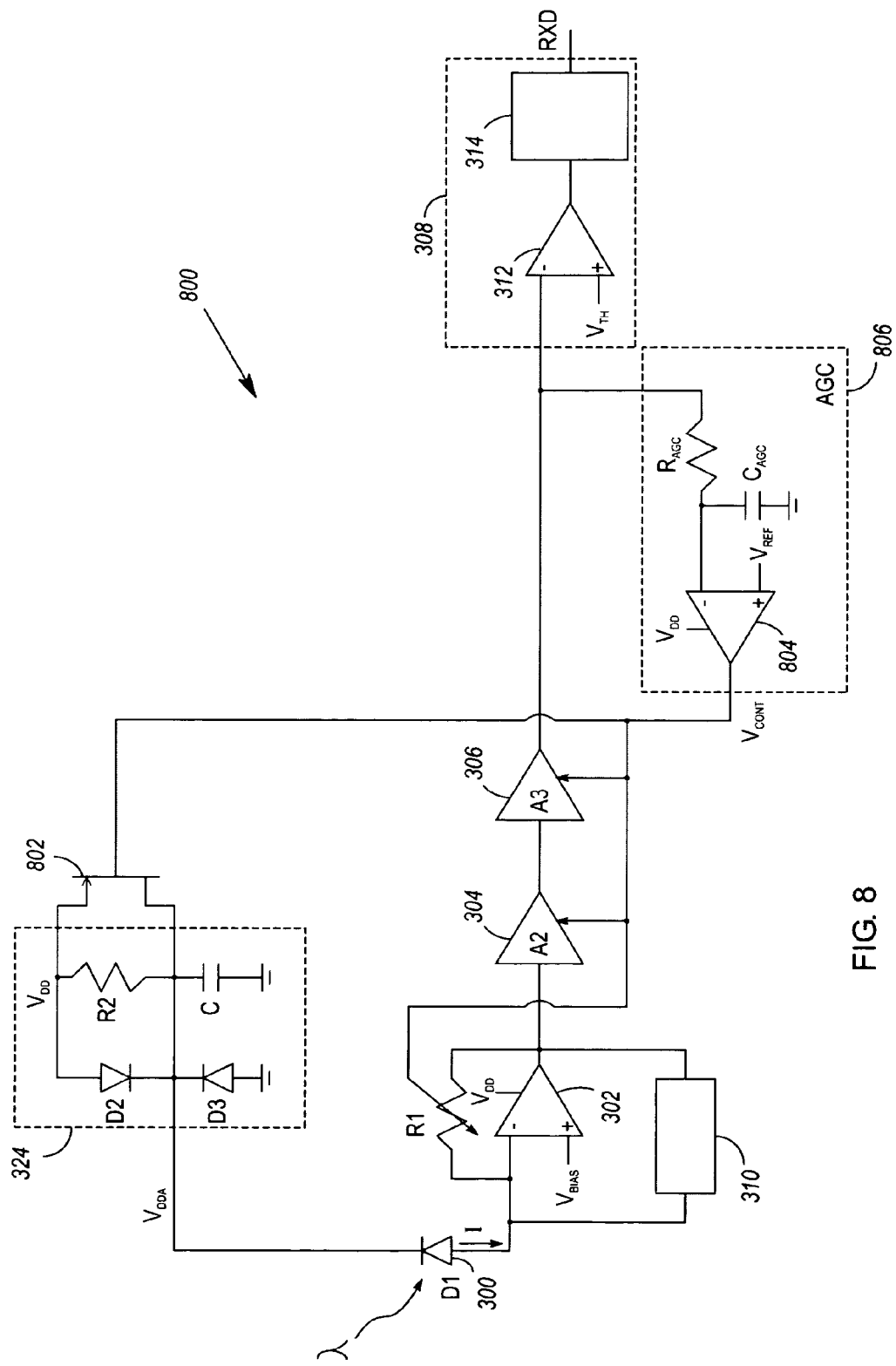
FIG. 8 illustrates a second exemplary optical receiver that may be used to implement the FIG. 6 method.

FIG. 8 illustrates a second exemplary optical receiver 800 that may be used to implement the method 600. The receiver 800 is similar to the receiver 200a shown in FIG. 3, but for the fact that the switching circuit 802 is continuously variable, to thereby provide continuous variation in the noise control provided by the noise control circuit 324.

In lieu of the comparator 320 and switch 322 provided in the receiver 200a, the receiver 800 excludes the comparator 320 in lieu of a PMOS transistor 802 that operates in its triode region as a variable linear resistor (also referred to herein as a continuously variable switch).

The receiver 800 also differs from the receiver 200a in that the polarity of the error amplifier 804 in the AGC circuit 806 is opposite that of the error amplifier 318 in the AGC circuit 316. Thus, when there is no irradiance of the photodiode 300, the magnitude of the gain control signal, $V_{CONT}$, will be high, because the voltage at the inverting input of the error amplifier 318 is lower than the reference voltage, $V_{REF}$, at the non-inverting input of the error amplifier 318. When the magnitude of $V_{CONT}$ is at its highest level, each of the amplifier stages 302-306 will be at its maximum amplification, the PMOS transistor 802 will be OFF, and the noise control circuit 324 will be ON. As input irradiance increases (i.e., as the photodiode's output current increases), the magnitude of the gain control signal decreases, thus beginning to turn the PMOS transistor 802 ON, and beginning to diminish the noise control provided by the noise control circuit 324.

What is claimed is:

1. Apparatus, comprising:
   an optical transducer that generates an output signal representative of optical irradiance;
   a noise control circuit, coupled in a power supply path of the optical transducer; and
   a switching circuit, responsive to changes in the output signal of the optical transducer, to vary the noise control provided by the noise control circuit.

2. The apparatus of claim 1, wherein the switching circuit varies the noise control provided by the noise control circuit in discrete steps.

3. The apparatus of claim 1, wherein, in response to changes in the output signal of the optical transducer, the switching circuit continuously varies the noise control provided by the noise control circuit.

4. The apparatus of claim 1, wherein the switching circuit i) turns the noise control circuit on below a given threshold value of the optical transducer's output signal, and ii) turns the noise control circuit off above the given threshold value.

5. The apparatus of claim 1, wherein the switching circuit decreases the noise control provided by the noise control circuit as the magnitude of the optical transducer's output signal increases.

6. The apparatus of claim 1, wherein the noise control circuit comprises a first-order, low-pass filter.

7. The apparatus of claim 1, wherein the noise control circuit comprises an RC filter, and wherein the switching circuit comprises a metal-oxide semiconductor (MOS) transistor that is coupled in parallel with the resistor of the RC filter.

8. The apparatus of claim 1, wherein the noise control circuit comprises an RC filter, and a diode coupled in parallel with the resistor of the RC filter.

9. The apparatus of claim 1, further comprising:
   one or more variable amplifier stages to amplify the output signal of the optical transducer; and
   an automatic gain control (AGC) circuit to control i) at least one of the variable amplifier stages, and ii) the switching circuit.

10. The apparatus of claim 9, wherein the AGC circuit provides a digital control signal to the switching circuit.

11. The apparatus of claim 9, wherein the AGC circuit provides an analog control signal to the switching circuit.

12. The apparatus of claim 1, further comprising an integrated circuit, the optical transducer, noise control circuit and switching circuit all being formed on the integrated circuit.

13. The apparatus of claim 12, wherein the noise control circuit comprises an RC filter.

14. The apparatus of claim 1, wherein the noise control circuit comprises an RC filter, the resistor being in the range of tens to hundreds of killiohms, and the capacitor being in the range of tens to hundreds of picofarads.

15. The apparatus of claim 1, wherein the optical transducer is an infrared transducer.

16. A method, comprising:
   as optical irradiance of an optical transducer decreases, increasing the gain of one or more amplifier stages receiving an output of the optical transducer;
   switching a noise control circuit into a power supply path of the optical transducer as the gain of the amplifier stage(s) increases above a first threshold;
   as optical irradiance of the optical transducer increases, decreasing the gain of the one or more amplifier stages; and
   switching the noise control circuit out of the power supply path as the gain of the amplifier stage(s) decreases below a second threshold.

17. The method of claim 16, wherein the first and second thresholds are the same threshold.

18. A method, comprising:
   as optical irradiance of an optical transducer decreases, increasing the gain of one or more amplifier stages receiving an
   output of the optical transducer; and
   increasing the noise control provided by a noise control circuit coupled in a power supply path of the optical transducer.

19. The method of claim 18, further comprising:
   as optical irradiance of the optical transducer increases, decreasing the gain of the one or more amplifier stages; and
   decreasing the noise control provided by the noise control circuit.

20. The method of claim 18, wherein the noise control provided by the noise control circuit is increased in discrete steps.

* * * * *